Feb. 12, 1952 W. H. BURKE 2,584,982
VENTILATING SHUTTER
Filed April 14, 1945 3 Sheets-Sheet 1
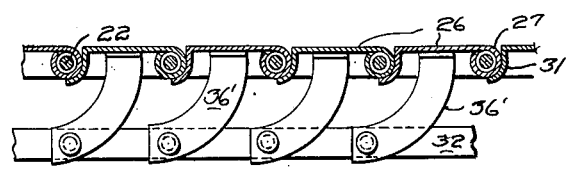
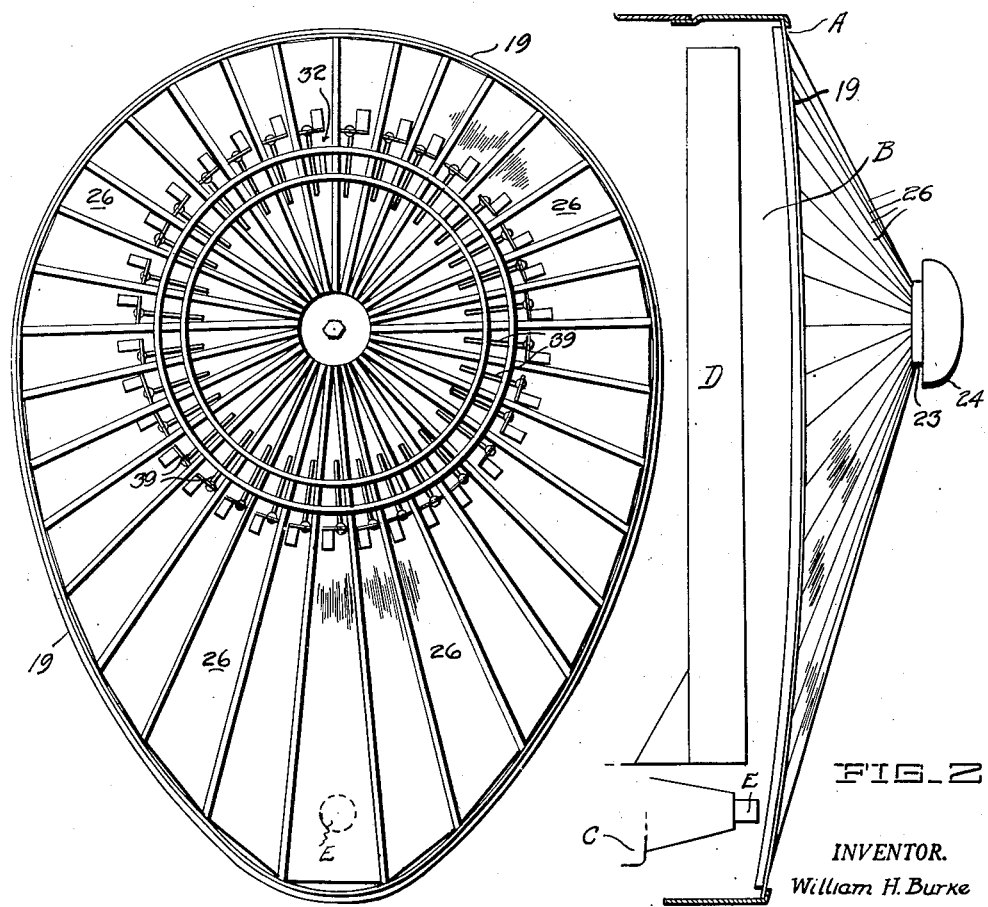
INVENTOR.
William H. Burke
BY Gardner & Warren
his attys.

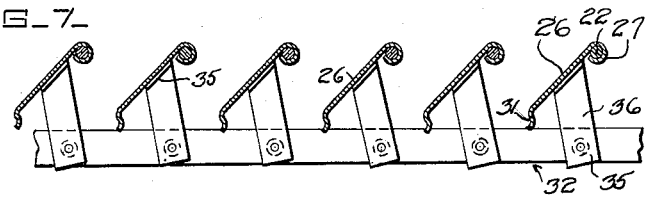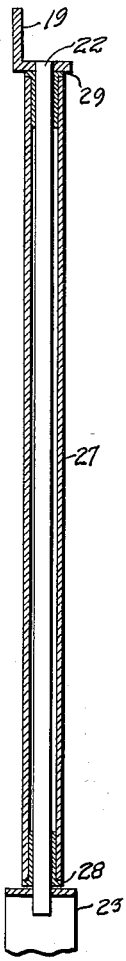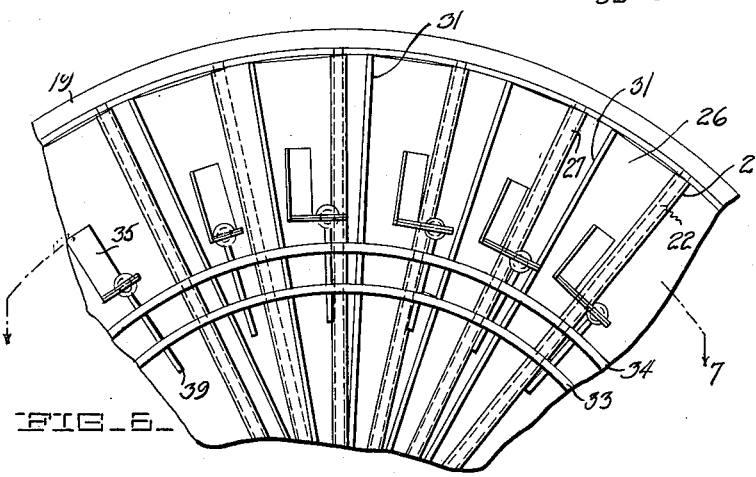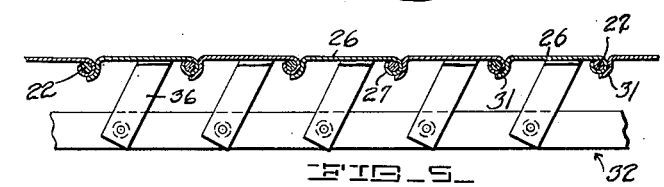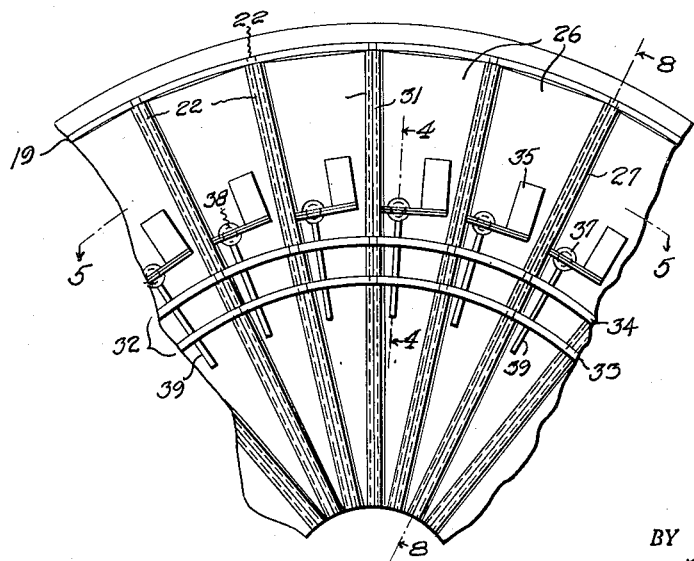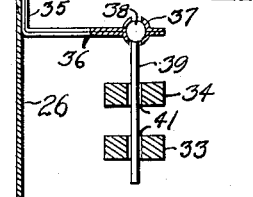
INVENTOR.
William H. Burke

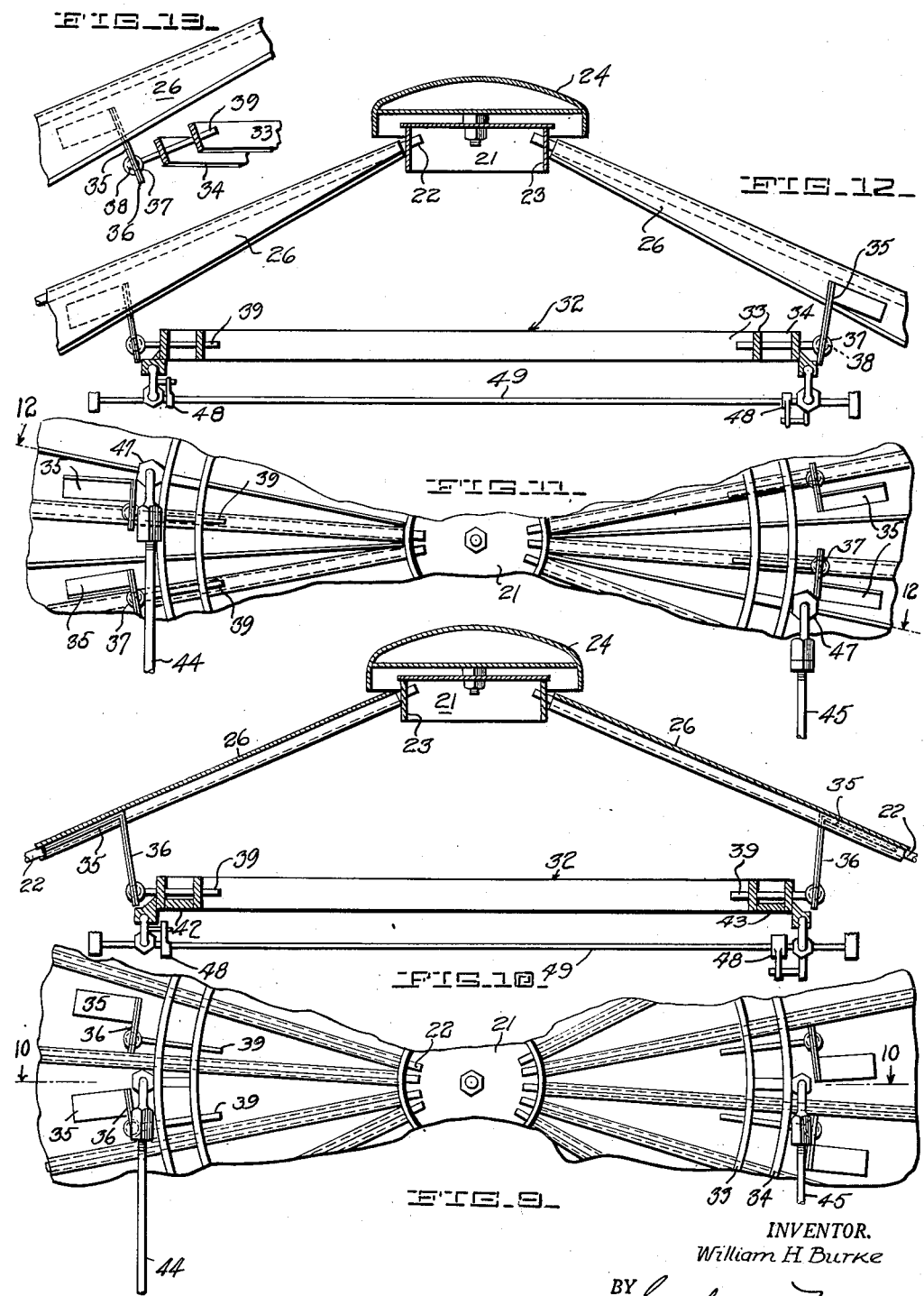

Patented Feb. 12, 1952

2,584,982

UNITED STATES PATENT OFFICE 2,584,982

VENTILATING SHUTTER

William H. Burke, Oakland, Calif.

Application April 14, 1945, Serial No. 588,397

3 Claims. (Cl. 189—62)

The invention relates to a shutter device, and more particularly in the present embodiment to a type of shutter designed for use in conjunction with the engine compartment of an automobile or the like for regulation of air thereto for cooling purposes.

An object of the present invention is to provide a shutter mechanism incorporating a plurality of vanes extending radially from a common center, in which the vane actuating means will be completely removed from such center and eliminated as a material obstruction to the free passage of air through the shutter in the open positions of the latter.

Another object of the present invention is to provide in connection with a shutter assembly having a plurality of radially extending vanes, an actuating mechanism which will permit moving the vanes from one position to another in a smooth and effortless manner, provide for a straight line application of the actuating force for effecting movement of the vanes, and avoid the use of any loose or other parts likely to rattle when the automobile or the like, is in motion.

Another object of the invention is to provide a shutter device which will be readily adaptable to a variety of external shapes, and which may be easily incorporated in divergent automobile body designs.

A further object of the present invention is to provide a shutter assembly with radial vanes, in which the vanes and the regulating mechanism therefor are formed independent of any central mounting, whereby a central portion of the shutter is free of any obstructions, giving access to the interior of the shutter and providing, such as when the shutter is utilized on aircraft, a central aperture for disposal of the propeller shaft therethrough.

A still further object of the invention is to provide in a radial vane shutter of the character described, an actuating means arranged for cooperation with the vanes to effect a full opening and a full closing in the positioning of the vanes.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is an elevational view of the device looking from the interior side.

Figure 2 is a side elevational view of the device shown in Figure 1.

Figure 3 is a fragmentary rear elevational view of a portion of the device shown in Figure 1.

Figure 4 is a sectional view of a portion of the shutter vane actuating means, taken on the line 4—4 of Figure 3.

Figure 5 is a developed cross-sectional view of the fragment of the device shown in Figure 3, taken on the line 5—5.

Figure 6 is a fragmentary rear elevational view, similar to Figure 3, but showing the shutter vanes in partly open position.

Figure 7 is a developed cross-sectional view taken on the line 7—7 of Figure 6, and similar to Figure 4, but showing the vanes in partly open position.

Figure 8 is a radially extending cross-sectional view on an enlarged scale taken along the line 8—8 of Figure 3.

Figure 9 is a fragmentary rear elevational view of a different portion of the device from that shown in Figure 3.

Figure 10 is a cross-sectional view taken along the line 10—10 of Figure 9.

Figure 11 is a fragmentary rear elevational view similar to Figure 9, but showing the vanes in partly open position.

Figure 12 is a cross-sectional view taken along the line 12—12 of Figure 11, and similar to Figure 10 but indicating the vanes in partially opened position.

Figure 13 is a somewhat enlarged cross-sectional view showing the attachment between the vane and a somewhat modified actuator ring.

Figure 14 is a developed cross-sectional view showing a modified vane bracket construction.

The device incorporating the features of my invention, as embodied in a shutter, comprises, generally, an outer substantially vertically extending frame 19, preferably, and as here shown, formed of angle iron or the like, and having a generally oval or egg-shape contour. When the shutter assembly is applied to an automobile as here shown the frame is secured along the edges of the opening A at the front end of the compartment B in which the engine C and radiator D is contained. Provided within the frame mediately of the sides but nearer the top is a central hub 21 which is secured to the frame by means of a plurality of radius rods 22. As shown in Figure 2, the frame 19 when viewed from the side is curved like the leg of a parabola, and the hub is transversely offset from the frame and defines with the radius rods 22 a conical section erected upon the frame. Hub 21 is preferably formed with cylindrical walls 23, surmounted by a cap 24, the radius rods 22 being secured at their inner ends within apertures formed in the walls 23 and at their outer ends, as will be clear from Figure 8, to the frame 19. The rods 22 extend radially outwardly from the hub 21 to their point of intersection with the frame, and define sectors of equal apices but of unequal radial extent.

Journalled upon the radius rods 22 for rotation thereon are vanes or louvres 26 and as shown such vanes are preferably formed of light gauge metal and of a shape to correspond to the sectors between adjacent radius rods 22. Each of the plurality of vanes 26 has rolled in one longitudinal edge thereof a curl or hollow bead 27, designed to enclose one of the rods 22 about which the vane is to rotate. In order to minimize rotational friction, the bead 27 exceeds in internal diameter the outside diameter of the associated rod 22, as shown in Figure 8, providing a space therebetween, bushings 28 and 29 being inserted in opposite ends of the bead 27 to serve as anti-friction bearings for rotation of the vane upon rod 22. The longitudinal edge of the vane opposite the bead 27 is angularly offset to form an arcuate overlapping portion 31, designed to engage upon the bead 27 of the adjoining vane, when, as shown in Figure 5, the vanes are in closed position. The vanes are preferably formed with a flat face, as shown, but even if of other form, due to the multiplicity of vanes and the relatively small arcuate dimensions of each vane, the combined effect is of a substantially smooth-faced cone. It will thus be seen that the vanes 26 when in closed position, present a tight, continuous air shield over the entire shutter area.

As a means of rotating the vanes from closed to open or partially open position, an actuating mechanism is provided, and as here shown includes a circular actuator member 32, positioned at the rear of the shutter and arranged to be rotated for moving the vanes to the different positions. The member 32 is preferably comprised of a pair of concentric rings 33 and 34, lying one within the other and connected to the vanes through means including angular brackets 35. The latter are rigidly fixed to the vanes and are each formed with an arm extending rearwardly from the vane in substantially perpendicular relation to the plane thereof. Operative connection of the arms 36 with the member 32 is effected by means of radial pins 39 slidable longitudinally in apertures 41 in the rings, and having at one end a ball 38 engaging for universal rotation in a spherical socket 37 provided in the free end of the bracket arm. Rings 33 and 34 are preferably rigidly secured together such as by spacers 42 and 43, and it will thus be clear that due to the radial positioning of the pins on the rings, the pins will provide a full support for member 32 independent of any attachment or engagement with the shutter parts at any other point.

As will be evident, rotation of the circular member 32 about its center will cause the brackets to swing the vanes about the radius rods 22 and thus move the vanes to open or closed position, the member being at the same time caused to move axially to or from the vanes. Likewise as the member is rotated, the pins will be moved longitudinally in the apertures in the rings since the bracket arms move the ball and socket connections tangentially with respect to member 32. It will thus be clear that in effecting opening or closing of the vanes, the member 32 will partake of a compound movement, and a constant change in axial relationship of the radius rods and pins will take place. Such movement and change in relation between the parts will be fully and smoothly permitted by the utilization of the universal connections between the bracket arms and pins, and the longitudinal movement of the pins. Should it be desired to provide for a freer movement of the pins in the rings, such as by increasing the size of the apertures engaged by the pins, looseness and rattling of the parts may readily be prevented by forming the bracket arms of spring material and bending the arms so as to place the pins in transverse tension in the apertures. If preferred, the rings may be secured together in axial offset relation as shown in Figure 13 so that the pins will extend forwardly and inwardly in more conformity with the positioning of the radius rods.

Desirably, and as will be clear from Figure 7, the relationship in the positioning of the axes of the radius rods and pins is such that the pins and the bracket arms will remain directly back of the vanes in all of the open positions of the vanes. In this manner practically no portions of the actuator mechanism except the relatively thin edges of the rings will oppose the incoming air, and therefore a smooth and unobstructed passage will be afforded between the vanes.

Any suitable means may be provided for effecting rotation of the member 32. As here shown such rotation is arranged to be effected with a pair of links 44 and 45 connected to the rear side of the rings at diametrically opposed points by universal joints 47. The links extend generally tangentially of the member and are preferably secured at their free ends to opposite crank throws 48 fixed to a common shaft 49. With this arrangement effective rotation of the actuator member is assured, since upon turning of shaft 49 a combined pulling and pushing action will be exerted on the member. As only slight force is required for rotating the member, actuation and control of the vanes may be readily effected automatically such as by thermostatically or thermoelectrically operating means.

It will be evident that with the use of the actuating means of my invention, a very large number of vanes may be employed for the shutter, such feature being particularly advantageous where the shutter is incorporated in a vehicle of the type designed for exposure to high wind velocity and pressure, such as an airplane, the relatively small frontal area of each vane minimizing the force required to close the vane against the wind. Furthermore due to the generally conical smooth frontal presented by the vanes when the shutter is in closed position, a streamline effect will be produced and a material reduction in the resistance to the wind gained.

With the mechanism designed as described and shown in connection with the prepared embodiment of the invention, the maximum open position of the shutter will be reached when the free edge portion 31 of the vanes abuts the forward edge of member 32. In this position the vanes will be disposed as shown in Figure 7 at an approximate open angularity of forty degrees and the air flowing through the interstices, between the vanes will, due to the compound angularity of the surface of the vanes, have imparted to it a rotating movement over substantially the entire area of the shutter, thus not only providing for the desired ventilation of the air but effectively expelling by centrifugal action the extraneous and undesirable matter from the air. As previously explained the shutter is mounted in the opening A at the front of the compartment B in which the engine C and radiator D is contained, and it is important to note that the vanes of the lower portion of the shutter project lower than the radiator so as to insure effective direct ventilation of the lower part of the radiator and the compartment, and that when the vanes are in open position, free access to the crank shaft E of the engine for a starting ratchet is provided in the space arranged to be occupied by the lower middle vane, and thus dispensing with the need of added crank hole covers, plates or the like. Where the brackets are formed of a flexible material as aforesaid, the vane at the space opposite the shaft may be opened independently of the others when access is desired. It is to be noted that notwithstanding the vanes are thus long enough to provide for direct control of the air to the bottom of the radiator, the radiating center of the vanes is above the vertical center of the opening engaged by the shutter assembly so that the center of the swirling action produced by the vanes, will be located in the upper or hotter portion of the engine compartment.

If desired and as shown in Figure 14, the actuator member may be connected to the vanes in a manner to permit a full opening of the shutter, that is, with the vanes moved to open angularity of ninety degrees. This may be accomplished by attaching the pins and bracket arms 36' so that the ball and socket connections will have a greater radial spacing from the radius rods in both extreme positions of the vanes. Furthermore in this embodiment, the arms are formed arcuate so as to provide greater clearance with the adjacent vanes.

I claim:

1. In a ventilating shutter assembly and actuating mechanism arranged for positioning at the front end of an engine compartment for automobiles and the like a central member, a plurality of vanes each mounted to swing about axes extending radially outwardly and rearwardly of said member from open to closed position and combining when in closed position to define substantially a hollow cone with the convex side at the front and the concave side at the rear, and an actuating unit for opening and closing said vanes carried by said vanes within the concave side.

2. In a ventilating shutter assembly and actuating unit for controlling the supply of air to the engine compartment of an automobile, a frame arranged for positioning across said compartment at the front thereof and including a central member and a peripheral member, rods extending radially between said members and sloping outwardly and rearwardly from the central member, vanes formed to cover the spaces between said rods and frame members and pivotally secured along one edge to said rods and arranged when in closed position to combine to define substantially a hollow cover with the convex side facing the front and the concave side facing the rear, an actuator ring supported exclusively by said vanes and positioned to lie within said concave side, the means of support for said ring including brackets secured to said vanes and extending substantially perpendicular from the rear side of the vanes, pins mounted and slidable radially in said ring, universal connecting said brackets with said pins outwardly of the periphery of the ring, and means for rotating said ring including a pair of links secured to said ring at diametrically opposed points, a shaft mounted for rotation about an axis substantially parallel to a line intersecting said points, opposite crank arms on said shaft connected to said links.

3. A ventilating shutter assembly and actuating unit therefor as defined in claim 2, characterized by the brackets of a material and form providing for flexibility of the connection between the vanes and pins and normally holding the pins in resilient engagement with the ring.

WILLIAM H. BURKE.

REFERENCES CITED

The following references are of record in the file of this patent:

UNITED STATES PATENTS

| Number | Name | Date |
| --- | --- | --- |
| 1,735,760 | Howard | Nov. 12, 1929 |
| 1,791,790 | Burke | Feb. 10, 1931 |
| 2,007,600 | Forbes | July 9, 1935 |